3,146,279
SELECTIVE ISOMERIZATION PROCESS
James P. Gallagher, Park Forest, Ill., assignor to Sinclair Research, Inc., Wilmington, Del., a corporation of Delaware
No Drawing. Filed Apr. 4, 1962, Ser. No. 184,931
6 Claims. (Cl. 260—683.65)

The present invention relates to a process for isomerizing paraffinic hydrocarbons. Particularly the present invention relates to a method for isomerizing parafinic hydrocarbons while suppressing hydrocracking and increasing conversion of the paraffinic hydrocarbon. Specifically, the present invention relates to the selective isomerization of paraffinic hydrocarbons in the presence of an alumino-silicate molecular sieve-type catalyst.

Alumino-silicate molecular sieve-type catalysts are known and are generally made up of porous crystals wherein the pores of the crystals are of molecular dimensions and are of substantially uniform size. Accordingly, the crystal pore size determines which compound or component will be adsorbed within the crystal, i.e. those compounds which have a critical molecular diameter greater than the crystal pore diameter are not able to penetrate the crystal lattice and, accordingly, are not adsorbed, whereas those compounds which have a critical molecular diameter smaller than the crystal pores are able to penetrate the crystal lattice and be adsorbed therein.

Other alumino-silicate molecular sieve-type selective adsorbents include the synthetic and naturally occurring zeolites, which, when dehydrated, may be described as crystalline zeolites having a rigid three dimensional anionic network and having interstitial dimensions sufficiently large to adsorb one type of compound to the substantial exclusion of another type of compound. The naturally occurring zeolite, chabazite, exhibits such properties in that it selectively adsorbs straight chain hydrocarbons to the substantial exclusion of non-straight chain hydrocarbons. Another naturally occurring zeolite is analcite $NaAlSi_2O_6 \cdot H_2O$ which, when dehydrated, and when all or part of the sodium is replaced by an alkaline earth metal, such as calcium, by base exchange yields a material which may be represented by the formula $$(Ca, Na_2)\ Al_2Si_4O_{12} \cdot 2H_2O$$

and which after suitable conditioning will adsorb one molecular type, such as straight chain hydrocarbons, to the substantial exclusion of another molecular type, such as non-straight chain hydrocarbons. Naturally occurring or synthetically prepared phacolite, gmelinite, harmotome, and the like or suitable base exchange modifications of these zeolites are also useful as selective adsorbents.

In accordance with the present invention an improved isomerization process for normal paraffins having a carbon content greater than six carbon atoms is obtained by conducting the isomerization reaction in the presence of an alumino-silicate type catalyst which has had all, some or none of its sodium content base-exchanged with calcium and has uniform pore openings of at least about 9 A. suitable for easy egress of the various hydrocarbon molecule types found in an ordinary feedstock and the egress of the reaction products. In present practice, isomerization of normal paraffins containing more than six carbon atoms, is usually attended to by poor selectivity due to excessive hydrocracking to lower molecular weight compounds and this effect becomes more prominent as the carbon number of the feedstock increases. It has now been found that in order to obtain a good yield with high selectivity in the isomerization of normal paraffins containing more than six carbon atoms a certain relationship should exist between the acidity of the catalyst and the molecular weight of the feedstock, i.e. the acidity of the catalyst should be in direct proportion to the molecular weight of the feedstock. By varying the amount of the sodium and calcium components of the catalyst, the acidic strength may be changed, e.g. by increasing the calcium content, the acidity of the alumino-silicate catalyst is increased.

The prior art has recognized that the sodium in the crystalline alumino-silicate can be base-exchanged with numerous metals or hydrogen cations to convert the sodium form of the alumino-silicate crystal to a more active form to enhance the catalytic behavior. What the prior art has, however, failed to recognize is the correlation between the amount of calcium base-exchanged for sodium and the carbon atom length of the feed material to be treated. Within the practice of the present invention, it has been found that the selectivity of the isomerization of normal paraffins containing more than six carbons is interdependent upon the relationship between the amount of sodium base-exchanged and the carbon atom length of the feed.

The normal paraffin hydrocarbon forming the feed mixture to the present invention has 7 to 30 or more carbon atoms, preferably has 7 to 16 carbon atoms in the molecule. While purified normal paraffinic hydrocarbons preferably form the feed mixture, it is contemplated that mixtures of the paraffinic hydrocarbons may also be employed, especially those containing at least about 80% normal paraffins. Also, the process of the present invention may be applied to the treatment of hydrocarbon fractions such as petroleum fractions containing straight chain and non-straight chain hydrocarbons and wherein the amount of straight chain hydrocarbon is substantial, e.g. in the range of about 2 to 35% by volume, and higher.

The catalyst base of the present invention, as mentioned above, is a crystalline alumino-silicate having pore openings of at least about 9 A., preferably about 10 to 15 A., sufficient to freely admit individual molecules normally found in an ordinary feedstock, and which can be base-exchanged with calcium. One such alumino-silicate-type adsorbent is sold under the tradename Linde Type 13X molecular sieve and is suitable as a base in the present invention. When manufactured, the catalyst base has a mol ratio of silicon to aluminum of about 1:1 to 1.5:1, preferably about 1.2:1 and analyzed about 20 to 25 weight percent preferably about 25% sodium as $Na_2O$. The alumino-silicate base may be reacted with a calcium salt to replace part of, or all of the sodium content by effecting ion exchange. The amount of sodium that is replaced is dependent upon the carbon chain length of the feedstock. It is to be realized that the alumino-silicate base may not need to have any of the sodium replaced, such as for instance when the feed consists essentially of material having a carbon length of about 7 carbon atoms.

The above relationship existing in the present invention may be quantitatively expressed in terms of the weight percent of calcium that is to be substituted for the sodium in the alumino-silicate base and the carbon chain length of the normal paraffin to be isomerized. The percentage of calcium is directly proportional to the carbon chain length of the normal paraffinic hydrocarbon and is approximately equal to $$X = \frac{y-7}{0.1R}$$

wherein X represent the weight percent of calcium based on total sodium and calcium content, y is an integer from 7 to 30 and represents the carbon chain length of the normal paraffin that is to be isomerized and R has a value between about 0.5 to 2, preferably a value of about 0.75 to 1.5. It is particularly advantageous when R is 1.

It can readily be seen that when y equals seven there will be essentially no calcium present in the sodium alumino-silicate base. Also, when y is greater than seventeen, and the value of R is 0.5 to 1 the value of X will be equal to or greater than 100 atom percent of calcium. This, of course, means that when the carbon chain of the normal paraffin has more than about seventeen carbon atoms, essentially all of the sodium in the base should be substituted with calcium. From this relationship the weight percent of calcium that should be present in the base can be readily determined when the carbon chain length of the material to be isomerized is known. This allows for the selection of maximum operating conditions resulting in a good yield and high selectivity in the isomerization of normal paraffins. For instance, as the carbon chain increases, so also should the acidity of the alumino-silicate catalyst, due to the increase in the calcium content. This allows operation at lower temperatures, thereby minimizing thermal cracking of the high moleculear weight normal paraffins which are more susceptible to cracking at high reaction temperatures. However, as the carbon number increases the selectivity of the isomerization reaction decreases to some extent in that there is some cracking, but this cracking is almost exclusively demethanation, which is not duly significant in paraffins having a long carbon chain.

The alumino-silicate base is activated with a catalytically active metal hydrogenation-dehydrogenation component such as, for instance, the Group VIII metals of the Periodic Table, e.g. nickel or particularly the platinum group noble metals, such as, palladium and platinum, preferably platinum. The activating metal can be added in amounts of about 0.01 to about 10 or 15 or more, preferably about 0.1 to 1 weight percent. In activating the alumino-silicate base a dispersion of the metal-containing material is employed for coating or combining the alumino-silicate particles with the promoting metal. The dispersion can be a true solution, e.g. chloroplatinic acid, or a colloidal dispersion. The continuous liquid of the dispersion should be essentially inert and not have any substantial deleterious effect on the alumino-silicate base. The dispersion usually has a pH broadly in the range of about 5 to 10 and preferably is a practically neutral pH of about 7. It is preferred when the activating metal is platinum that the metal chloride buffered with ammonia have a pH between about 7.5 and 9. Suitable liquid vehicles for depositing the catalyst-promoting metal onto the alumino-silicate base are: water and a lower aliphatic alcohol of 1 to 4 carbon atoms. Water is the preferred liquid vehicle for efficiency and economy in the practice of the present process, but a liquid vehicle which does not create much ionization of the catalyst-promoting material is also attractive because there is less likelihood of blocking the fine pores of the mineral sorbent with a dispersion of catalyst-promoting material in the manufacturing operation. Solutions of non-ionizing or weakly ionizing metalliferous catalytic agent, or colloidal dispersions of the agent may also be used. The resulting catalytic material is then calcined in the presence of a sweeping gas, e.g. air or oxygen, in order to remove adsorbed or combined water from the finished catalytic material usually at a temperature from about 750 to 1200° F. or more.

The isomerization is generally carried out in the vapor phase. The feedstock is passed over the catalyst at a temperature of from about 600 to 1000° F., preferably about 700 to 900° F. depending upon the level of acidity to which the catalyst has been adjusted. Generally, as the molecular weight of the feedstock increases, the catalyst acidity will also be increased by base exchanging calcium metal for sodium and thereby the operating temperature may be decreased. Pressures may be in the range from about 100–1000 p.s.i.g., preferably about 200 to 500 p.s.i.g. The reaction is conducted in the presence of free hydrogen in a mole ratio of hydrogen to hydrocarbon of at least about 3:1 and may be in the range of about 5:1 to 20:1, preferably about 7:1 to 15:1. Space velocities are generally in the range of about 0.1 to 10, preferably about 0.5 to 5 WHSV (weight of feed per weight of catalyst per hour).

The practice of this invention will be better understood by the following examples which, however, are not to be construed as limiting.

EXAMPLE I 200 grams of Linde 13X molecular sieve (1/16″ extrudate) were poured into 6.5 l. of deionized water in which 146 g. of $CaCl_2$ had been dissolved. The solution and extrudate were agitated slowly overnight. The solution was decanted and the molecular sieve was washed with deionized water. The molecular sieve was treated twice more in this manner with $CaCl_2$ solutions of the above concentration. After the third treatment the washing with deionized water was continued until a negtaive chloride test was obtained from the wash water. The molecular sieve was drained of wash water and 1 liter of deionized water and 18 ml. of $H_2PtCl_6$ solution (56 mg. Pt/ml.) were added. 0.5 of 7.5 M $NH_4OH$ solution was also added which brought the pH of the solution to 8. After about 65 hours of slow stirring the pH was measured to be about 6, and was raised to 10 by the addition of 1.2 ml. of 7.5 M $NH_4OH$. The stirring was continued over night and the pH measured about 7. The pH was raised to 10 by the addition of 3.2 ml. of 7.5 M $NH_4OH$. Adsorption of the platinum, as judged by the yellow color of the supernatant solution, was very slow. 10 ml. of 15 M $NH_4OH$ were added each day for four days while the suspension was stirred slowly. The mixture was stirred for another 72 hours after the final $NH_4OH$ solution. The catalyst was then filtered on a Büchner funnel and transferred to an 8″ crystallizing dish where it was dried over night at about 225° F. in a forced-air drying oven. The catalyst was calcined in a muffle furnace adjusted so as to reach about 1050° F. for about 3 hours. Analysis of the catalyst showed 2.4% Na and 0.45% Pt. About 90 weight percent of the original soda content was replaced with calcium.

This catalyst was used to isomerize a normal hexadecane feed at a temperature of 700° F., a pressure of 500 p.s.i.g., a space velocity of 2 WHSV and a hydrogen to hydrocarbon ratio of 15. The liquid product yield was 97% and analysis of this product is shown in Table I.

*Table I*

| Component: | Weight percent of liquid product |
|---|---|
| $nC_{16}$ (unconverted feed) | 38.5 |
| $C_{16}$ isomers | 36.3 |
| $C_{15}$ | 18.2 |
| $C_{14}$ | 1.4 |
| $C_{13}$ | 5.6 |

As can be seen from this data, of the 61.5% of the feed converted, 57.4% was converted to isomers of n-hexadecane, and 85.8% to isomers of hexadecane and to pentadecane. In the isomerization of paraffins of this carbon atom length, loss of one carbon atom is normally not detrimental to the product.

EXAMPLE II

The catalyst from Example I was used to isomerize a normal heptane feed at a tempertaure of 900° F., a pressure of 350 p.s.i.g., a space velocity of 2 WHSV and a hydrogen to hydrocarbon mole ratio of 7. The liquid product yield was 69% and analysis of this product is shown in Table II.

*Table II*

| Component: | Weight percent on feed |
|---|---|
| $nC_7$ (unconverted feed) | 12.2 |
| $C_7$ isomers | 41.5 |
| $C_6$ | 12.8 |
| Benzene and toluene | 2.5 |
| $C_4$-gas | 31.0 |

As can be seen from the data about 58.5 of the feed converted was cracked to materials lighter than the feed. The loss of one carbon atom in paraffins of this carbon length is detrimental to the product. At lower temperatures, lower conversions were obtained with no significant improvement in selectivity. This excessive cracking is ascribed to the acidity of this catalyst due to high percentage of calcium replacing the sodium.

EXAMPLE III 100 g. of Linde 13X molecular seive (1/16" extrudate) were placed in a 3 liter beaker with 500 ml. of deionized water and 9 ml. of $H_2PtCl_6$ solution (56 mg. Pt/ml.). The extrudate and solution were stirred slowly. 10 ml. of 15 M $NH_4OH$ were added. After 24 hrs. another 10 ml. of 15 M $NH_4OH$ were added, and after stirring for 48 hours a final 10 ml. of 15 M $NH_4OH$ were added. The mix was stirred for another 72 hrs. after the final $NH_4OH$ addition. The molecular seive was then transferred to an 8" crystallizing dish, decanted free of excess solution and dried in a forced air drying oven at about 225° F. The catalyst was calcined in a muffle furnace programmed to reach 1050° F. from room temperature in about 5 hrs. and then maintained at 1050° F. for 3 hrs. Analysis of the catalyst showed 0.42% Pt and the original soda content remained the same.

This catalyst was used to isomerize a normal hexadecane feed at a temperature of 800° F., a pressure of 350 p.s.i.g., a space velocity of 2 WHSV and a hydrogen to hydrocarbon mole ratio of 7. The liquid product analysis is shown in Table III.

*Table III*

| Component: | Weight percent of liquid product |
|---|---|
| $nC_{16}$ (unconverted feed) | 25.4 |
| $C_{16}$ isomers | 31.4 |
| $C_{15}$ | 21.9 |
| $C_{14}$ | 1.3 |
| $C_{13}$ | 20.1 |

As can be seen, of the 74.6% of the feed converted, 42% was converted to isomers of n-hexadecane and 71.4% to isomers of hexadecane and to pentadecane. 28.6% of the feed converted was cracked to lighter materials. This selectivity is lower than that obtained in Example I and is ascribed to the lower acidity of the catalyst due to the absence of calcium in the catalyst, requiring a higher operating temperature and resulting in excessive thermal degradation of the feedstock. At 700° F., the isomerization temperature used in Example I, the conversion of normal hexadecane to all products was only 8%.

EXAMPLE IV

The catalyst from Example III was used to isomerize a normal heptane feed at a temperature of 900° F., a pressure of 350 p.s.i.g., a space velocity of 2 WHSV and a hydrogen to hydrocarbon mol ratio of 7. The liquid product analysis is shown in Table IV.

*Table IV*

| Component: | Weight percent of liquid product |
|---|---|
| $nC_7$ (unconverted feed) | 38.4 |
| $C_7$ isomers | 53.4 |
| $C_6$ | 7.0 |
| Benzene and toluene | 1.2 |

Of the 61.6% of the feed converted, 86.6% was converted to isomers of heptane. Compared to Example II, where 58.5% of the feed converted was cracked to materials lighter than the feed, only 12.3% of the feed converted in the present example was converted to lighter material. This increase in selectiveness is attributed to the lower acidity of the catalyst, due to the absence of calcium in the catalyst, resulting in less hydrocracking to light materials.

I claim:
1. A method for isomerizing a normal paraffin hydrocarbon having at least seven carbon atoms while suppressing hydrocracking which comprises contacting said hydrocarbon in a conversion zone under isomerization conditions in the presence of hydrogen, with a catalytic promoting amount of a hydrogenation-dehydrogenation metal-containing crystalline alumino-silicate catalyst having a uniform pore diameter of at least about 9 Angstroms, and having about 20 to 25 weight percent of an alkaline metal oxide of a metal selected from the group consisting of calcium and sodium, said alkaline metal oxide having a percentage of calcium directly proportional to the carbon chain length of the normal paraffin hydrocarbon and is approximately equal to

$$\frac{y-7}{0.1R}$$

where $y$ is the carbon chain length of said hydrocarbon and R is a number from about 0.5 to 2, the balance being essentially sodium, and recovering an isomerized hydrocarbon product having essentially the same molecular weight as said normal paraffin hydrocarbon.

2. The process of claim 1 wherein the normal paraffin hydrocarbon having at least seven carbon atoms is contacted in the vapor phase with the metal-containing crystalline alumino-silicate catalyst at a temperature between about 600 to 1000° F.

3. The process of claim 1 wherein the paraffin hydrocarbon has from 7 to 30 carbon atoms.

4. A method for isomerizing a normally paraffin hydrocarbon of from 7 to 16 carbon atoms while suppressing hydrocracking which comprises contacting said hydrocarbon in the vapor phase in a conversion zone under isomerization conditions at a temperature of about 700 to 900° F. and a hydrogen to hydrocarbon mol ratio of about 7:1 to 15:1, with a metal-containing crystalline alumino-silicate catalyst having a uniform pore diameter of at least about 10 to 15 Angstroms, said metal consisting essentially of about 0.1 to 1 weight percent platinum and having about 25 weight percent of an alkaline metal oxide of a metal selected from the group consisting of calcium and sodium, said alkaline metal oxide having a percentage of calcium which is in direct proportion to the carbon chain length of said hydrocarbon and is approximately equal to $$\frac{y-7}{0.1R}$$

where $y$ is the carbon chain length of said hydrocarbon and R has a value of about 0.75 to 1.5, the balance being essentially sodium and recovering an isomerized hydrocarbon product having essentially the same molecular weight as said normal paraffinic hydrocarbon.

5. The method of claim 4 wherein R has a value of 1.
6. The method of claim 4 wherein the metal-containing, crystalline alumino-silicate catalyst has a mole ratio of silicon-to-aluminum of about 1:1 to 1.5:1.

References Cited in the file of this patent

UNITED STATES PATENTS

| 2,971,903 | Kimberlin et al. | Feb. 14, 1961 |
| 2,971,904 | Gladrow et al. | Feb. 14, 1961 |